United States Patent [19]

Forestieri

[11] Patent Number: 5,413,105

[45] Date of Patent: May 9, 1995

[54] MEDIAN TEMPORAL FILTERING OF ULTRASONIC DATA

[75] Inventor: Steven F. Forestieri, Santa Clara, Calif.

[73] Assignee: Diasonics Ultrasound, Inc., Milpitas, Calif.

[21] Appl. No.: 239,993

[22] Filed: May 9, 1994

[51] Int. Cl.⁶ .............................................. A61B 8/00
[52] U.S. Cl. .............................................. 128/660.05
[58] Field of Search ...................... 128/660.05, 660.07, 128/661.04, 661.08, 661.09; 73/861.25; 324/307, 309

[56] References Cited

U.S. PATENT DOCUMENTS 4,540,946  9/1985  Sainz et al. ................ 73/861.25
4,770,184  9/1988  Greene, Jr. et al. ............ 128/661.08
4,818,938  4/1989  Sattin et al. ................... 324/309

Primary Examiner—George Manuel
Attorney, Agent, or Firm—Blakely, Sokoloff, Taylor & Zafman

[57] ABSTRACT

A method and apparatus of processing signals in an ultrasonic imaging system for imaging a living subject. The ultrasonic imaging system including an ultrasonic emitter, receptor and display. N temporally-spaced signals from ultrasound produced by a plurality of temporally-spaced referenced pulses are obtained and the amplitude (power) of each of the N temporally-spaced signals is determined. In various embodiments, N is an odd integer, usually, 1, 3, 5 or 7, depending on a user-setting. A median temporal signal of the N amplitude signals is then obtained. In implemented embodiments, the median is obtained by sorting a list of the N amplitude signals until (N+1)/2 signals have been sorted. The median is temporally filtered with a previous signal displayed on the display of the ultrasonic imaging system, wherein the temporal filtering including a filtering coefficient having a magnitude approximating a cardiac cycle of the living subject. Such processing is especially useful for angiography studies, wherein artifacts are removed providing a higher-quality image than in the prior art.

9 Claims, 7 Drawing Sheets

Sort/Median Filter

MEDIAN TEMPORAL FILTERING OF ULTRASONIC DATA

BACKGROUND OF THE INVENTION

1. Field of the Invention

The present invention relates to ultrasonic imaging. More specifically, the present invention relates to a median temporal filter which is used in connection with ultrasonic imaging, especially, for applications such as angiography.

2. Background Information

Various applications of ultrasonic imaging within living subjects have included the mapping of bloodflow within a subject under examination. Some applications for this technology include angiography studies or the mapping of blood vessels. Angiography has been a recent development in ultrasonic imaging, especially in systems such as the Spectra TM VST Masters Series brand ultrasonic imaging system available from Diasonics Ultrasound, Inc., of Milpitas, California which includes the UltrasoundAngio TM brand angiography modality. Such systems typically employ a front-end gain to the Doppler signal and then assign a color index to the power level of the Doppler signal received. This new color index signal is then passed to a temporal filter which averages the signal in order to eliminate any pulsatile information and increase the Signal to Noise Ratio (SNR). The implementation of such systems, especially for angiography studies, has encountered some problems with artifacts.

One main source of artifacts in angiography systems, as described above, are tissue flash and probe motion. Because probe motion is normally sustained for a large number of frames, it can usually be repressed only by blanking Doppler signals with frequency shifts below a certain threshold. When the probe becomes stationary, however, the sonographer can then study a fixed region and the problem normally resolves itself.

Tissue flash, however, is the result of either respiration of the patient or the systolic phase of the cardiac cycle. Since there is no way to repress these events, tissue flash provides a significant artifact in such a system.

FIGS. 1 and 2 illustrate an example of tissue flash as it occurs in a subject under examination in a ultrasonic imaging system during angiography studies. FIG. 1 illustrates a time versus displacement motion of the posterior wall of the carotid artery during the systolic phase of the patient's heartbeat. Note that the wall moves out quickly and retracts relatively slowly. As a result, the average frequency shift of the received Doppler signal from the vessel wall remains relatively high for a short period of time. Because the high pass filter typically applied to the Doppler signal exhibits a large gain gradient near the stopband, the power at the output of the filter produces a series of impulse-like outputs at the cardiac rate, as shown in FIG. 2.

As already discussed, one prior art method of reducing the effect tissue flash has upon the resulting signal is by using a linear filter. Linear filtering is used in the UltrasoundAngio system in the form of a frame-to-frame single-pole filter. This filter reduces the noise in the image by the following relationship:

$$\text{SNR Gain dB} = 10 \log (1/(1-\alpha))$$

where $\alpha$ is the pole location of the filter wherein $\alpha$ is set to a value to approximate the cardiac cycle of the subject (e.g., typically wherein approximately 75%–90% of the previously displayed signal is used to generate the new signal). Unfortunately, when a linear filter encounters tissue flash impulses, it distributes them temporally, effectively retaining them on the screen for long periods of time. The amount of suppression achieved by the filter is minimal if the impulse amplitude is much larger than the desired blood flow signals. Obviously, the linear filter is not ideal for dealing with tissue artifacts.

Thus, although such linear filters typically have unique advantages, especially in the application of typical prior art Doppler color flow imaging for angiography, such linear filters also possess inherent disadvantages. Prior art Doppler color flow imaging typically maintains the pulsatility of data. Angiography has no such requirement. Thus, prior art techniques of linear filtering, especially for Doppler color imaging in a living subject, possess certain disadvantages which are neither suitable for nor desirable for performing angiography by way of ultrasonic imaging.

SUMMARY AND OBJECTS OF THE INVENTION

One of the objects of the present invention is to provide a means for reducing tissue flash and other motion artifacts in ultrasonic imaging, especially for applications such as angiography.

Another of the objects of the present invention is to provide an improved imaging apparatus which may perform angiography studies of living subjects, which eliminates many of the defects of prior art imaging apparatus.

Another of the objects of the present invention is to improve image quality in imaging systems which use large amounts of temporal filtering.

These and other objects of the present invention are provided for by a method and apparatus of processing signals in an ultrasonic imaging system for imaging a living subject. The ultrasonic imaging system including an ultrasonic emitter, receptor and display. N temporally-spaced signals from ultrasound produced by a plurality of temporally-spaced referenced pulses are obtained and the amplitude (power) of each of the N temporally-spaced signals is determined. In various embodiments, N is an odd integer, usually, 1, 3, 5 or 7, depending on a user-setting. A median temporal signal of the N amplitude signals is then obtained. In implemented embodiments, the median is obtained by sorting a list of the N amplitude signals until $(N+1)/2$ signals have been sorted. The median is then temporally filtered with a previous signal displayed on the display of the ultrasonic imaging system, wherein the temporal filtering including a filtering coefficient having a magnitude approximating a cardiac cycle of the living subject. Such processing is typically performed upon an entire frame's worth of data, usually stored in a write-through frame buffer storing such N previously processed signals, and the results may then be displayed. Such processing is especially useful for angiography studies, wherein pulsatile information is eliminated, however, tissue flash, probe motion, and other artifacts are removed providing a higher-quality image than in the prior art.

Other objects, features and advantages of the present invention will be apparent from the description and figures which follow below.

BRIEF DESCRIPTION OF THE DRAWINGS

The present invention is illustrated by way of example and not limitation in the figures of the accompanying in which like references indicate like elements and in which.

DETAILED DESCRIPTION

The present invention describes a system which uses a median temporal filter prior to linear temporal filtering in ultrasonic imaging systems, especially those used for angiography studies. The present invention will be described with references to certain specific embodiments, such as specific hardware components, signals, etc., in order to provide a thorough understanding of the present invention. It will be obvious, however, to one skilled in the art that these specific details may not be required to practice the instant invention. In other instances, well-known components have not been described in detail in order to not unnecessarily obscure the present invention.

Some of the techniques applied in the present invention, although specifically described with reference to angiography studies, especially those using ultrasonic examination, it can be appreciated by one skilled in the art that such techniques may be applicable to other areas of signal processing.

Figure 3:
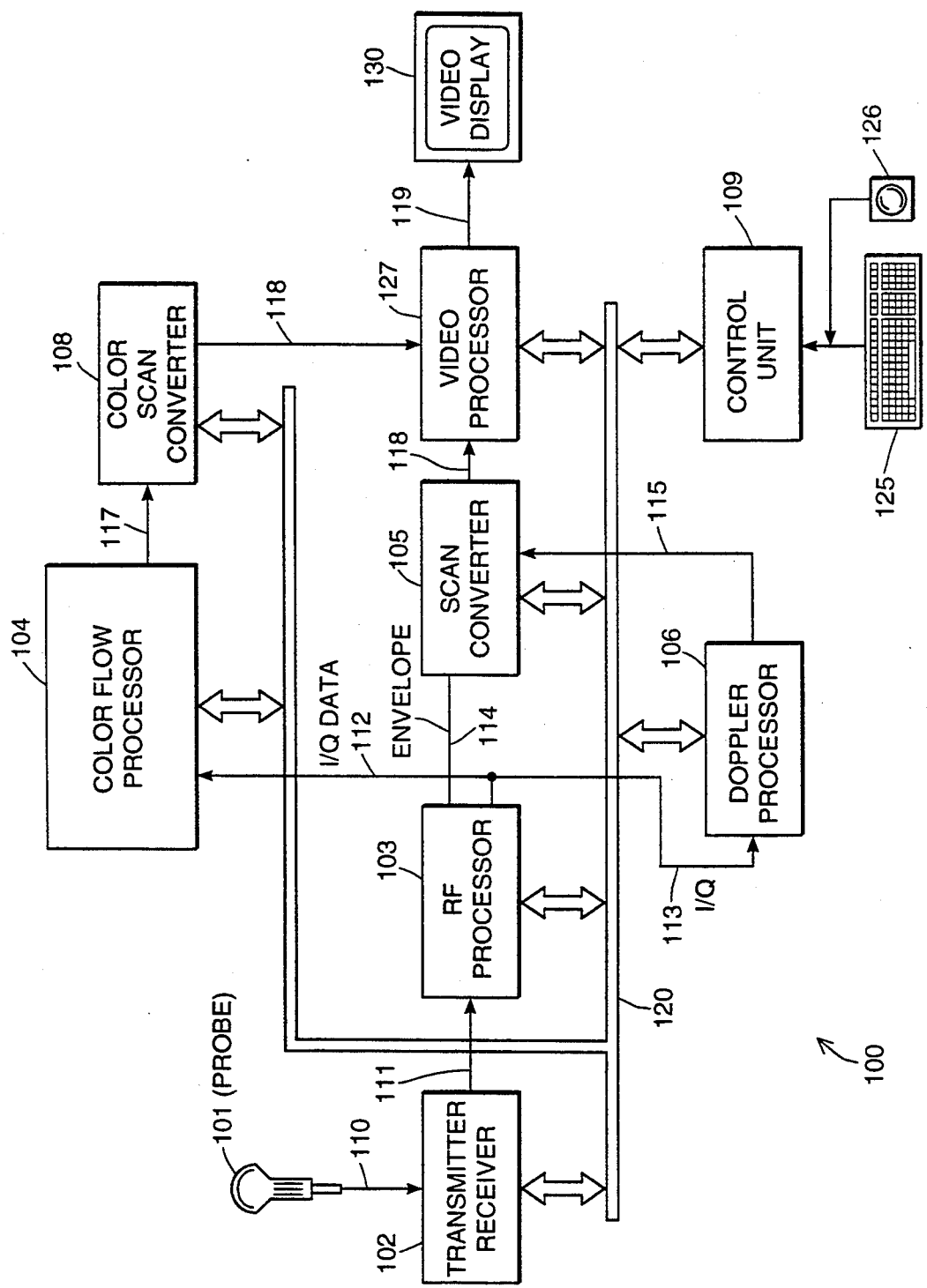
FIG. 3 illustrates a block diagram of an ultrasonic imaging system which is used for processing the signals described in the present disclosure.

The preferred embodiment resides in a system which has a color flow processor such as 104 illustrated in the apparatus shown in FIG. 3. This may include, for example, an apparatus such as that disclosed in U.S. Pat. No. 5,058,593 dated Oct. 21, 1991 which is assigned to Diasonics Ultrasound, Inc., the assignee of the present invention. The method and apparatus of the various implemented embodiments of the present invention may be implemented in discrete hardware components or, alternatively, in computers or digital signal processors using software which is loaded from disk based storage and executed at run-time. Programs containing the methods employing various implemented embodiments may also reside in firmware or other similar non-volatile storage means.

Figure 1:
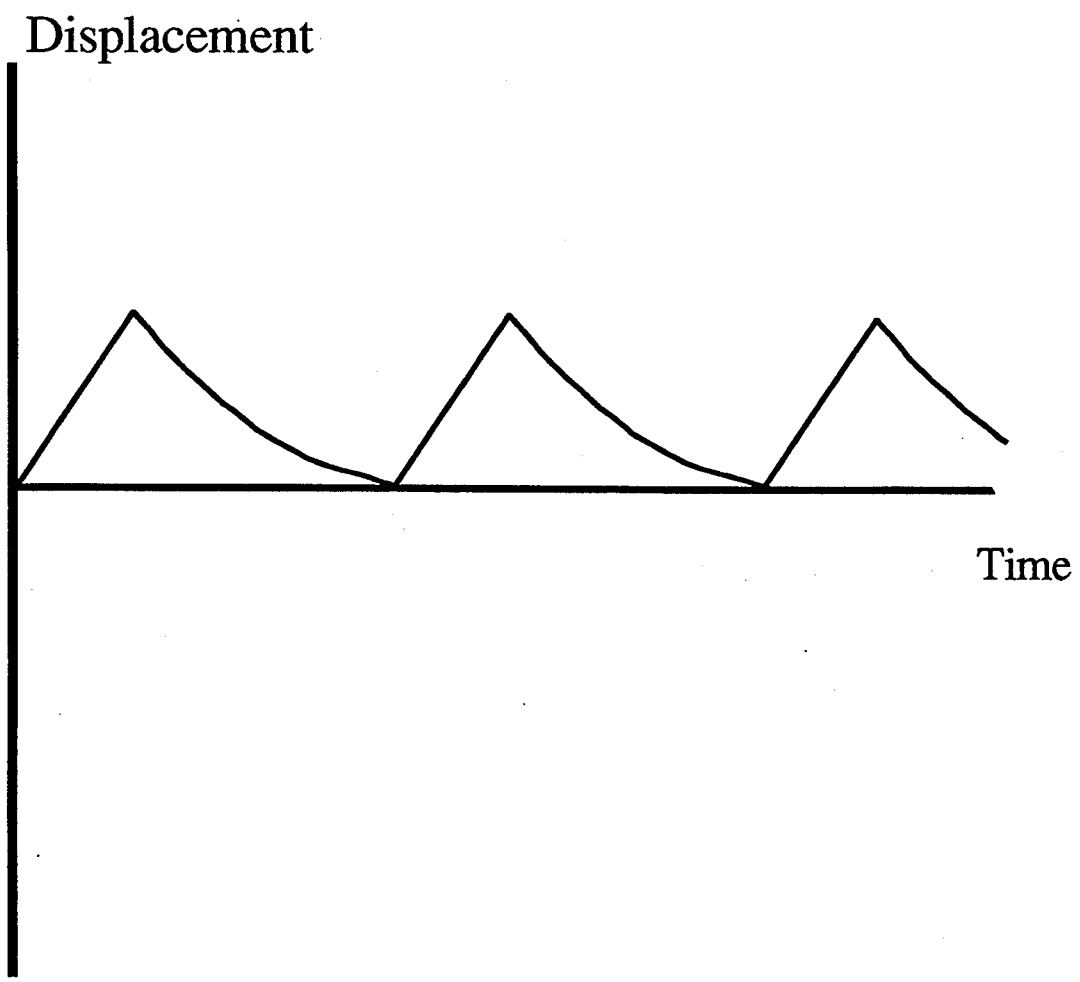
FIG. 1 illustrates a time versus displacement plot of a posterior wall of a carotid artery during the systolic phase of a cardiac cycle.
Figure 2:
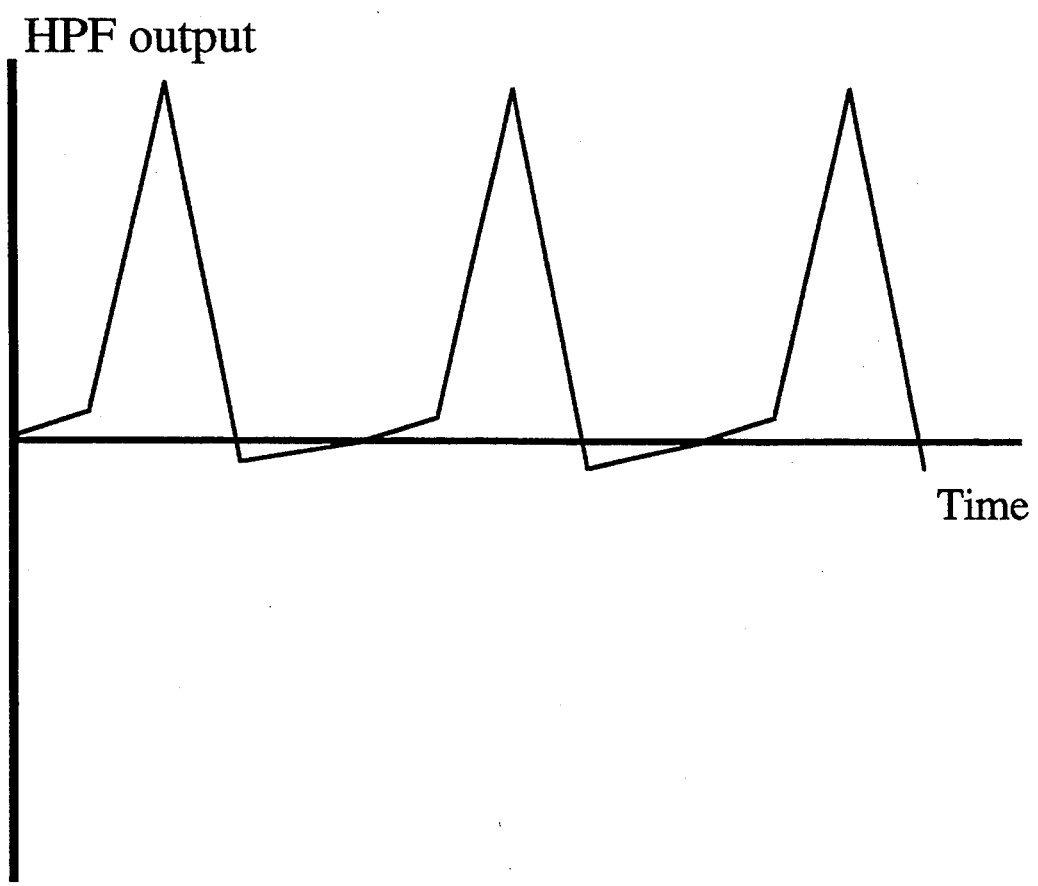
FIG. 2 illustrates the output from a high-pass filter which has been applied to the signal shown in FIG. 1.

The present invention implements a median temporal filter which is typically inserted in the signal path in a color flow processor such as 104 of FIG. 3, before linear temporal filtering is applied to a signal. In applications such as angiography, performed by means of ultrasonic imaging (e.g., the UltrasoundAngio ™ modality in the Spectra ™ VST Masters Series brand ultrasonic imaging system available from Diasonics Ultrasound, Inc. of Milpitas, Calif.) temporal filtering is applied to the signal in order to eliminate pulsatile information and boost the Signal to Noise Ratio (SNR). In contrast to prior art color flow systems seeking to show the direction of flow in a subject under examination, angiography studies merely seek to map blood vessels in the living subject. Thus, pulsatile and directional information is not required for such studies. Because of the large amplitudes as discussed with reference to FIGS. 1 and 2 due to movement of tissue in the living subject at certain temporal intervals, large magnitudes of signal occur in the system due to reflection of reference pulses due to moving tissue in the subject. In contrast to signals which would otherwise represent flow, tissue flash presents a problem for angiography studies in that, because of the long persistence times caused by the temporal filter, the signal caused by the tissue flash persists for long periods of time. This is addressed in implemented embodiments of the present invention by inserting a median temporal filter in the signal path just prior to the linear temporal filter, in order to remove any such large magnitude signals from the signal path. The details of this will now be discussed.

Figure 4:
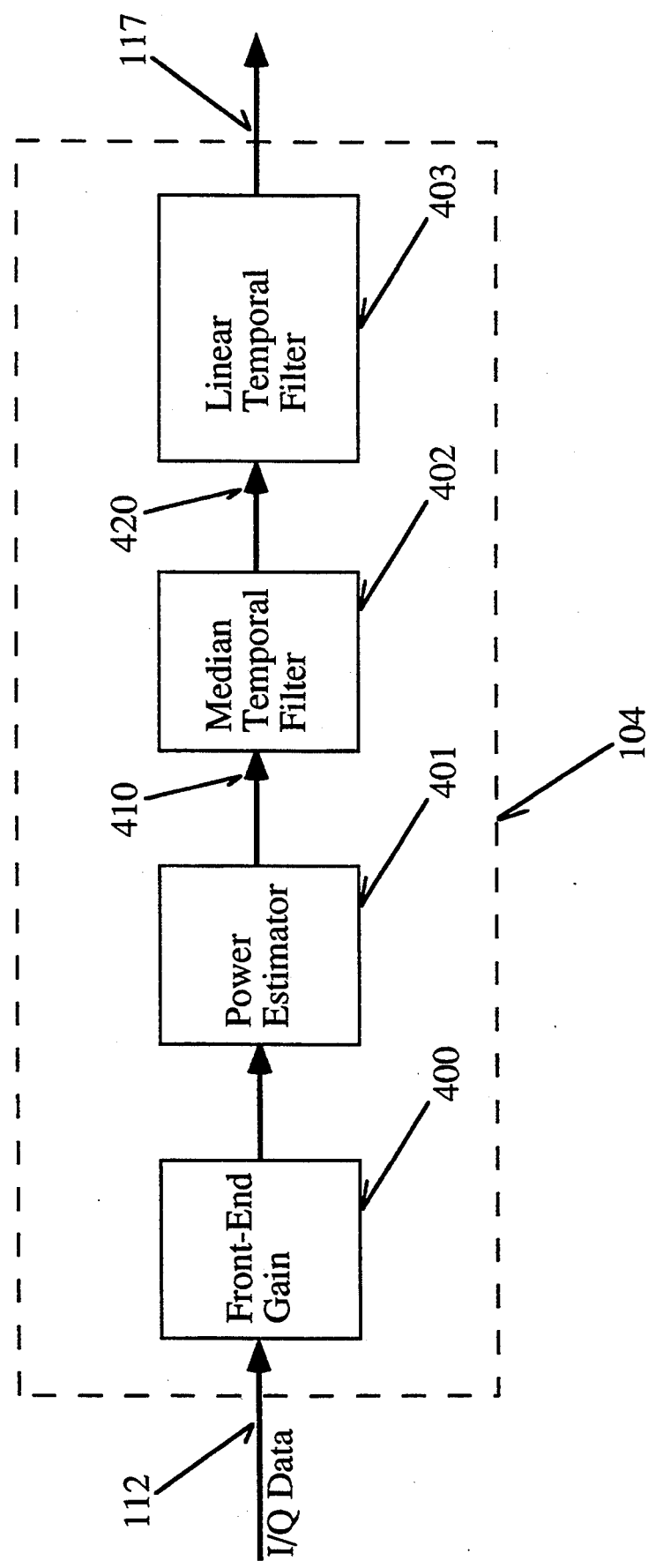
FIG. 4 illustrates a block diagram of apparatus and/or processes which may be present in a color flow processor for use during angiography studies by way of ultrasonic examination.

A block diagram of the components used in an angiography system's color flow processor 104 is shown in FIG. 4. Such a color flow processor may include discrete circuitry, where each of the blocks represents circuitry in such a system, or it may include software which is loaded and executed in processors in 104, such as digital signal processors and their associated memories as disclosed in U.S. Pat. No. 5,058,593. Signals such as the in-phase and quadrature data (I/Q) are received over a signal line such as 112 into the color flow processor. In an angiography system, a front-end gain 400 is usually applied to the I/Q data in order to raise the noise floor of the system to a value wherein it will be assigned to a color. In most prior art color flow processors, the noise floor is kept below a threshold in which it would be assigned a color. Angiography systems raise the level of the noise floor so that it is assigned a color as well as the flow information. Once a front-end gain has been applied to the signals, the signals are then passed to a power estimator 401, which determines the power of the flow information caused by the reference pulses. In angiography studies, in contrast to color flow studies, only the power of the flow is held instead of the velocity. Thus, directional and velocity information is not used during angiography.

Then, over signal line 410, the extracted power signal is passed to a median temporal filter 402, which derives a median from a plurality of temporally-spaced power signals received from power estimator 401. Median temporal filter 402 will process a set of samples, selecting the median from the group. In this manner, if a single signal exceeds the range of the typical flow signals, then it is assumed that that signal is an aberration (e.g., tissue flash or other intermittent artifact), and can be ignored. In addition, because pulsatile information such as flow occurring during the systolic phase of a subject's heartbeat is not required, the selection of a median from a set of samples is not detrimental to obtaining the angiography information. The details of the median temporal filter will be discussed in more detail below. Upon detection of the median from a set of samples N (wherein N is usually an odd integer), the median is passed over signal line 420 to a linear temporal filter 403, for temporal filtering in the normal course as in a prior art angiography system. In modalities such as the UltrasoundAngio system available from Diasonics Ultrasound, Inc., temporal filtering is very heavy, having a temporal filter α coefficient ranging between 0.7 and 0.95 typically approximating a full cardiac cycle of a subject. Thus, the heavy temporal filtering causes long persistence of signals on the display (e.g., 130 of FIG. 3). Because the median has been selected by median temporal filter 402, the persistence of these signals does not pose a problem since any aberrant information has been removed from the signal.

Figure 5:
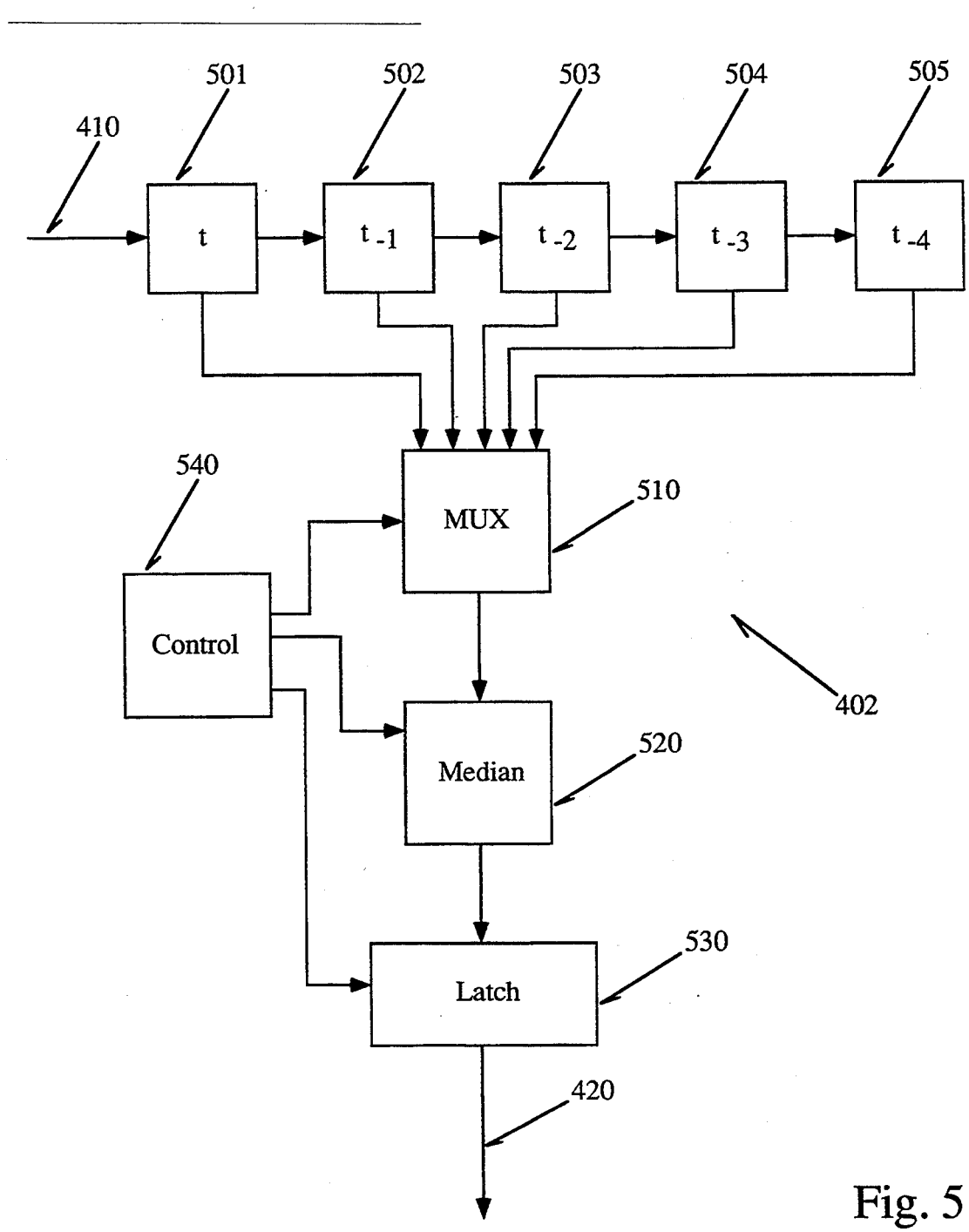
FIG. 5 illustrates a block diagram of a device for performing median filtering in one implementation of the present invention.

One implementation of the median filter 402 may include a device having a plurality of components as illustrated in FIG. 5. In such a system, a window of a previous N samples (e.g., 5 as illustrated in this implementation) may be maintained in a plurality of memory elements 501-505. It should be noted that it is useful if the number of samples N equals an odd number since that makes selecting the median straightforward. Using an even number of samples is possible, however, it is awkward because an average of the middle two elements or number of samples obtained from the previous time period may need to be performed. Each of the elements comprises a memory element for storing the temporally spaced samples and, as illustrated, each one is delayed by a single frame interval. In implemented embodiments of the present invention, samples are overlapped so that four samples from a previous iteration of the median filter are used, and only a single new sample is used for detection of the median during a current iteration of the filter. Each of the memory elements may be coupled to multiplexer 510, for selection by a control circuit 540. The control circuit 540 may select each of the memory elements 501-505 sequentially, determining which in fact is the exact median within the number of samples. This is placed into a second memory element 520. Once it has been determined which is the proper median signal from the memory elements 501-505, the resulting memory element 520 is loaded with the value, and the control unit 540 causes the latch 530 to allow the data to flow through, through signal line 420 to the linear temporal filter in color flow processor 104. Although only five samples have been shown for the sake of illustration in FIG. 5, implemented embodiments of the present invention use either 1, 3, 5 or 7 samples, depending on the operator settings applied by a user at the system console (e.g., 125 of FIG. 3). Note also that the circuitry illustrated in FIG. 5 is essentially duplicated for as many pixels as are required to be processed in video display 130. Thus, a complete frame of data is stored for each of the temporal periods for which samples are obtained and processed by the median temporal filter. In this way, the entire image displayed upon video display 130 of FIG. 3 is processed by median temporal filter 402.

Figure 6A:
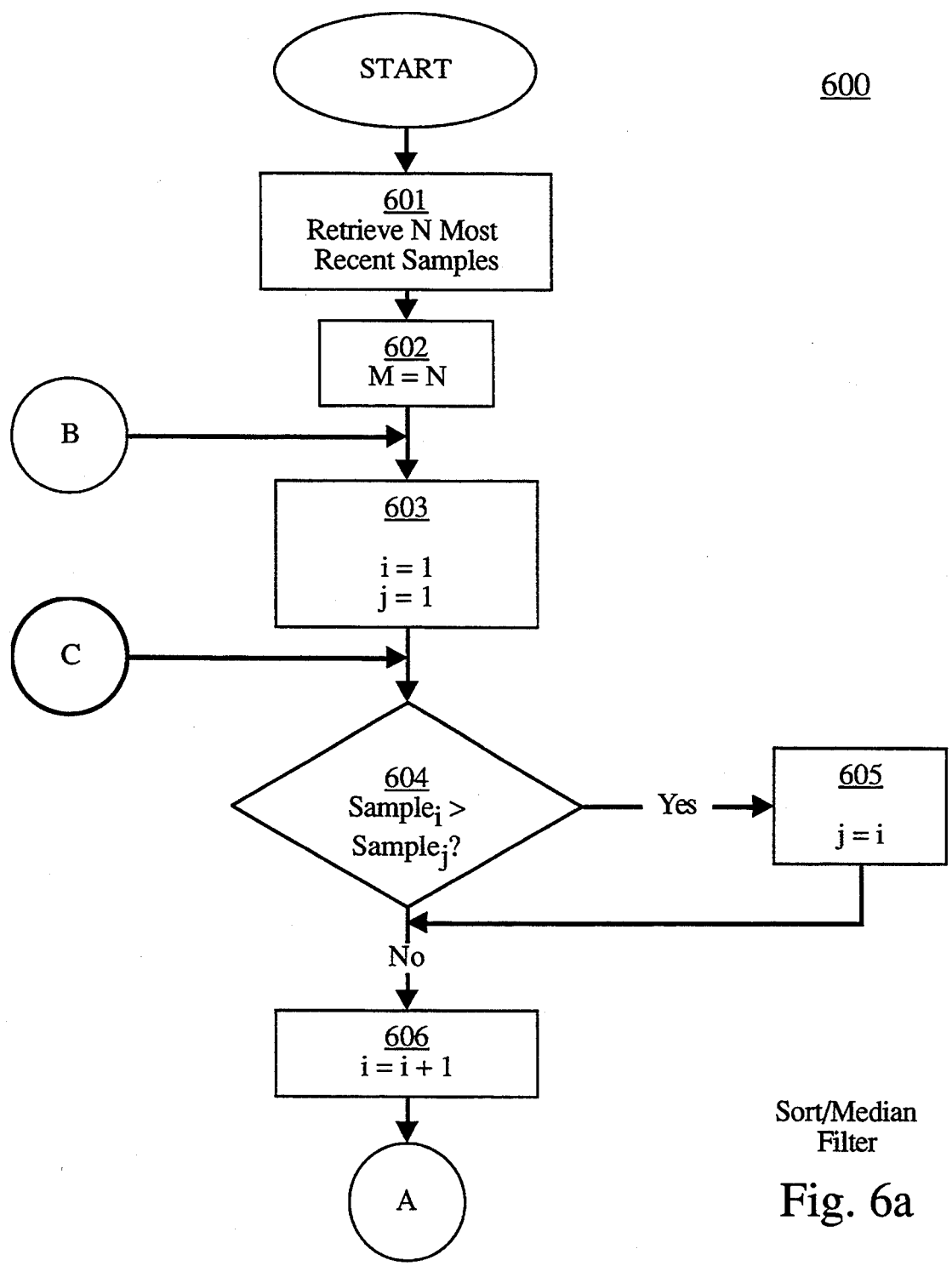
FIGS. 6a and 6b show a sorting median filter method which may be performed in one implementation of the present invention.
Figure 6B:
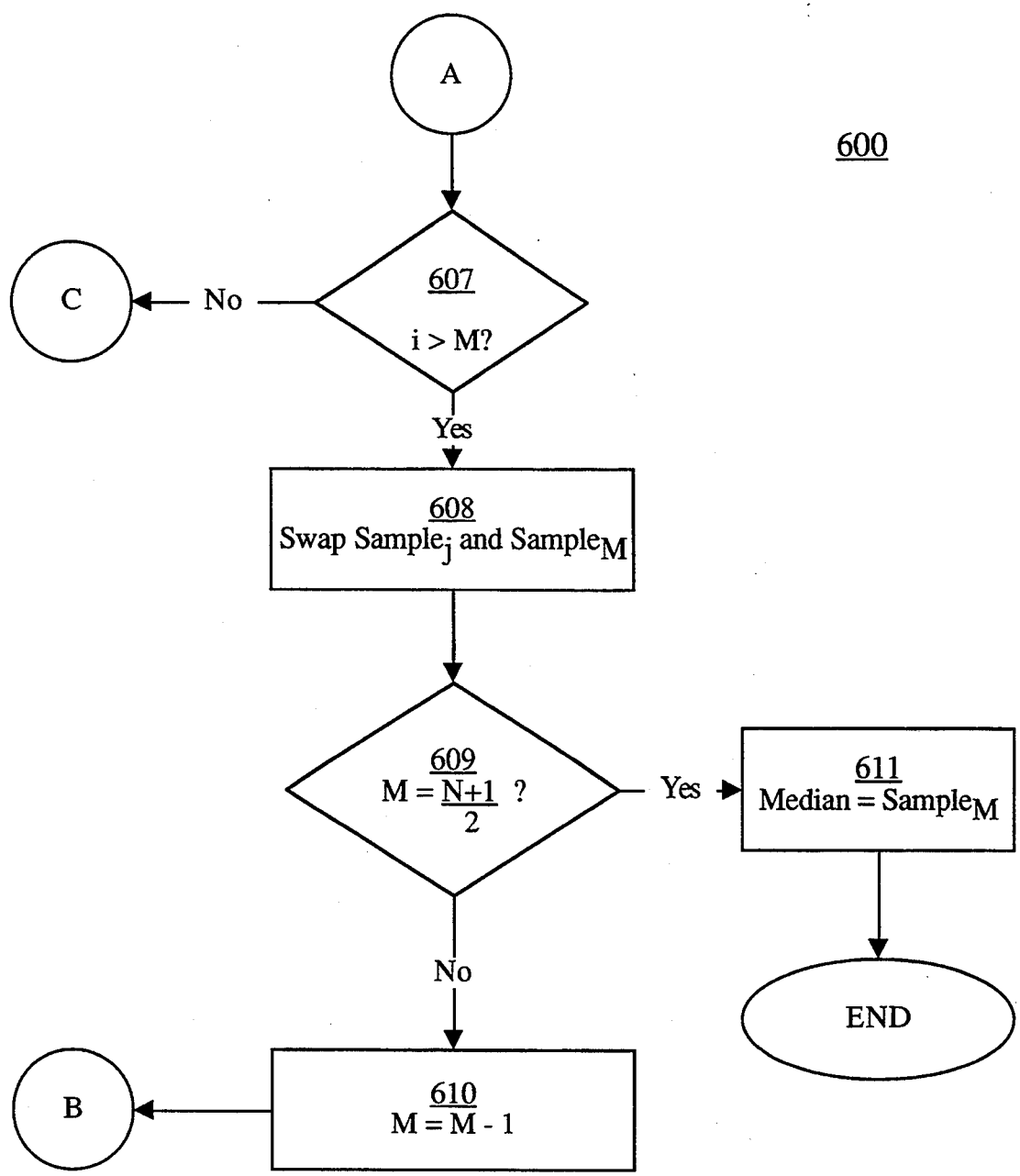

A suitably programmed digital signal processor and associated memories or the discrete circuitry illustrated in FIG. 5 may implement the method shown as 600 in FIGS. 6a and 6b. Process 600 is essentially a sorting algorithm wherein a number N of samples is retained from a window of N time periods, and are sorted from smallest to largest. In other implementations, it may be sorted from largest to smallest, in which case the process will be slightly modified (e.g., step 604 will perform a check of Sample$_i$<Sample$_j$?). As will become apparent, with an odd number N of samples, it is only important that $$\frac{N+1}{2}$$

samples be sorted in order to determine the median. In this implementation, a pointer or other reference is used to retain the position of the oldest sample in the number N of samples in order that the new sample for the current interval may simply replace that sample upon the next iteration of the processing for the new frame. A write through frame buffer is used for storing the previous N samples of entire blocks of data and the temporal ordering of samples in the list is otherwise not important. The sorting algorithm will allow the median to be determined most easily be sorting N samples until $$\frac{N+1}{2}$$

samples have been sorted from largest to smallest in reverse order. That is, once $$\frac{N+1}{2}$$

samples have been sorted, the median has been obtained by the last value sorted, and that value may be passed to temporal filter 403.

A process such as 600 commences in FIG. 6a and receives the N most recent samples at step 601. Then, at step 602, a temporary variable M for retaining the index for the number of samples to sort through this on iteration of the outer loop to obtain the median may be set equal to N at step 602. Then, at step 603, prior to commencement of the outer loop for the sorting process, the indices i and j may be set equal to 1-referencing the first element in the number of samples N. At step 604, it is determined whether Sample$_i$ is greater than Sample$_j$. If so, then the previously retained largest sample, Sample$_j$ is replaced by setting the index j equal to i at step 605. In another implementation, step 604 may determine whether Sample$_i$ is less than Sample$_j$. Other sorting criteria may be used in order to determine the median. Continuing with the process, if Sample$_i$ is not greater than Sample$_j$, or upon completion of step 605, the index is incremented at step 606. Then, it is determined, as illustrated in FIG. 6b, whether the index i has exceeded M at step 607. If so, then the inner loop comprising steps 604-607 is complete and process 600 proceeds to step 608 on FIG. 6b. If not, steps 604-607 in the inner loop iterate until all the number of samples M have been sorted through to determine the largest sample, Sample$_j$, in the group (in the first iteration of the loop, M is equal to N).

Upon the index i exceeding M as detected at step 607 in FIG. 6b, process 600 proceeds to step 608 which swaps Sample$_j$ and the last sample, Sample$_M$, in the sub-list M of samples N. In this manner, the largest Sample$_j$, is placed into last position in the sub-list Sample$_M$, and Sample$_M$ is placed in the position occupied by Sample$_j$. Then, step 608 proceeds to step 609 to determine whether the process is complete, that is, the number of sorted samples M in this iteration of the loop has become equal to $$\frac{N+1}{2}.$$

Only $$\frac{N+1}{2}$$

of the samples need to be sorted in order to determine the median. If M is not equal to $$\frac{N+1}{2},$$

then M is decremented at step 610 and only the first M−1 samples need to be sorted upon a subsequent iteration of the outer loop—steps 603–610. Step 610 then proceeds back to step 603 for another pass through the outer loop. Steps 603–610 iterate until it is determined at step 609 when M is equal to $$\frac{N+1}{2}.$$

When this occurs, the second half of the samples (from $$\frac{N+1}{2}$$

to N) in the list of samples N has been sorted and thus the median has been determined Sample$_M$ (wherein M =

$$M = \frac{N+1}{2}).$$

). Thus, decision diamond 609 will yield a positive result, and process 600 proceeds to step 611 setting the median equal to Sample$_M$. Then, as of step 611, process 600 is complete and the process may return at a typical process exit point or sub-routine return.

Thus, using the process 600 in FIGS. 6a and 6b, a number of samples N may be sorted until the median is determined, and the median may be used for further processing in the angiography system. In this manner, pulsatile information is eliminated from each group of samples N, and long-persistence temporal filtering may be applied. In this way, using ultrasonic imaging for angiography, tissue flash artifacts caused by aberrant large amplitude signals detected may be eliminated from the signal path, and do not appear on a display to a user of the system.

Thus, a median filter for processing of ultrasonic data, especially for use in angiography studies, has been described. Although the present invention has been described with reference to particular embodiments thereof, especially with reference to FIGS. 1–6b described above, these should be viewed as illustrative only, and are not to be viewed as limiting the present invention. Other modifications or substitutions may be made by one skilled in the art, without departing from the overall spirit and scope of the present invention. Thus, the present invention is only to be construed as limited by the appended claims which follow.

What is claimed is:

1. A method of processing signals in an ultrasonic imaging system for imaging a living subject, said ultrasonic imaging system including an ultrasonic emitter, receptor and display, comprising the following steps:
    a. obtaining N temporally-spaced signals from ultrasound produced by a plurality of temporally-spaced referenced pulses;
    b. determining an amplitude of each of said N temporally-spaced signals and generating N amplitude signals, wherein each amplitude signal of said N amplitude signals reflects the amplitude of a corresponding temporally-spaced signal of said N temporally-spaced signals;
    c. determining a median temporal signal of said N amplitude signals;
    d. temporally filtering said median temporal signal with a previous signal to produce a filtered signal, wherein the previous signal corresponds to a portion of an image displayed on said display of said ultrasonic imaging system, wherein said step of temporal filtering is performed based upon a filtering coefficient having a magnitude approximating a cardiac cycle of said living subject; and
    e. updating said portion of said image based on said filtered signal.

2. The method of claim 1 wherein said step of determining said median temporal signal includes sorting said plurality of N amplitude signals in a list and selecting an element in said list as said median temporal signal.

3. The method of claim 2 wherein said sorting includes sorting (N+1)/2 of said signals and determining said median temporal signal from said (N+1)/2 signals.

4. The method of claim 2 wherein said sorting includes sorting from a smallest magnitude signal to a largest magnitude signal.

5. The method of claim 2 wherein said sorting includes sorting from a largest magnitude signal to a smallest magnitude signal.

6. The method of claim 1 wherein N is one of the following values: 1, 3, 5, 7.

7. The method of claim 1 wherein the step of determining a median temporal signal of said N amplitude signals includes the steps of:
    storing the N amplitude signals in a plurality of first memory elements;
    providing a multiplexer coupled between the plurality of first memory elements and a second memory element;
    causing a control circuit to send control signals to the multiplexer to determine the median temporal signal based on the N amplitude signals stored in the plurality of first memory elements; and
    causing the control circuit to send control signals to the multiplexer to transmit the median temporal signal from a first memory element of said plurality of first memory elements in which the median temporal signal is stored to the second memory element.

8. An apparatus for processing signals in an ultrasonic imaging system for imaging a living subject, said ultrasonic imaging system including an ultrasonic emitter, receptor and display, comprising:
    a. first circuitry coupled to said emitter and receptor for obtaining N temporally-spaced signals from ultrasound produced by a plurality of temporally-spaced referenced pulses;
    b. second circuitry coupled to said first circuitry said for determining an amplitude of each of said N temporally-spaced signals and for generating N amplitude signals based upon said N temporally-spaced signals;
    c. third circuitry coupled to said second circuitry for determining a median temporal signal of said N amplitude signals; and
    d. fourth circuitry coupled to said third circuitry for temporally filtering said median temporal signal with a previous signal to produce a filtered signal wherein a portion of an image displayed on said display of said ultrasonic imaging system is based upon said previous signal, said fourth circuitry temporal filtering said median temporal signal based upon a filtering coefficient having a magnitude approximating a cardiac cycle of said living subject; and e. fifth circuitry coupled to said fourth circuitry and said display for updating said portion of said image based upon said filtered signal.

9. The apparatus of claim 8 wherein the third circuitry includes:

a plurality of first memory elements coupled to the second circuitry, the plurality of first memory elements receiving the N amplitude signals from the second circuitry;

a second memory element;

a multiplexer coupled between the plurality of first memory elements and the second memory element;

a latch coupled to the second memory element and to the fourth circuitry; and a control circuit coupled to the multiplexer and the latch;

wherein the control circuit sends control signals to the multiplexer to determine the median temporal signal based on the N amplitude signals stored in the plurality of first memory elements;

wherein the control circuit sends control signals to the multiplexer to transmit the median temporal signal from a first memory element of said plurality of first memory elements in which the median temporal signal is stored to the second memory element; and wherein the control circuit sends control signals the latch to transmit the median temporal signal from the second memory element to the fourth circuitry.

* * * * *